C. R. NUTT.

OSCILLATING MOTOR.

APPLICATION FILED MAR. 19, 1908.

908,316.

Patented Dec. 29, 1908.

3 SHEETS—SHEET 1.

Witnesses

Ed. R. Lusby.

E. L. Chandlee

Inventor

Charles R. Nutt.

By Woodward & Chandlee

Attorney

THE NORRIS PETERS CO., WASHINGTON, D. C.

C. R. NUTT.

OSCILLATING MOTOR.

APPLICATION FILED MAR. 19, 1908.

908,316.

Patented Dec. 29, 1908.

3 SHEETS—SHEET 2.

Inventor

Charles R. Nutt.

Witnesses

Ed. R. Lusby.

E. L. Chandlee

By Woodward & Chandlee

Attorney

THE NORRIS PETERS CO., WASHINGTON, D. C.

C. R. NUTT.
OSCILLATING MOTOR.
APPLICATION FILED MAR. 19, 1908.

908,316.

Patented Dec. 29, 1908.
3 SHEETS—SHEET 3.

Witnesses
Ed. R. Lusby.
E. L. Chandlee

Inventor
Charles R. Nutt.

By Woodward & Chandlee
Attorney.

THE NORRIS PETERS CO., WASHINGTON, D. C.

UNITED STATES PATENT OFFICE.

CHARLES R. NUTT, OF HUNTINGTON BEACH, CALIFORNIA.

OSCILLATING MOTOR.

No. 908,316. Specification of Letters Patent. Patented Dec. 29, 1908.

Application filed March 19, 1908. Serial No. 422,136.

*To all whom it may concern:*

Be it known that I, Charles R. Nutt, a citizen of the United States, residing at Huntington Beach, in the county of Orange and State of California, have invented certain new and useful Improvements in Oscillating Motors, of which the following is a specification.

This invention relates to means for converting motion into power, and more particularly to pendular motors and has for its object to provide a simple structure of this type which will be novel and desirable.

Another object is to provide such an article which may be adapted for use as a wave motor, wind motor or swinging weight motor.

Another object is to provide such an article which will convert motion of varying directions into power applied in a constant direction.

Another object is to provide such a structure which will be simple to manufacture and easy to operate.

Another object is to provide such an article which may be manufactured from stock material at a low cost.

Other objects and advantages will be apparent from the following description and it will be understood that changes in the specific structure shown and described may be made within the scope of the claims without departing from the spirit of the invention.

Figure 2:
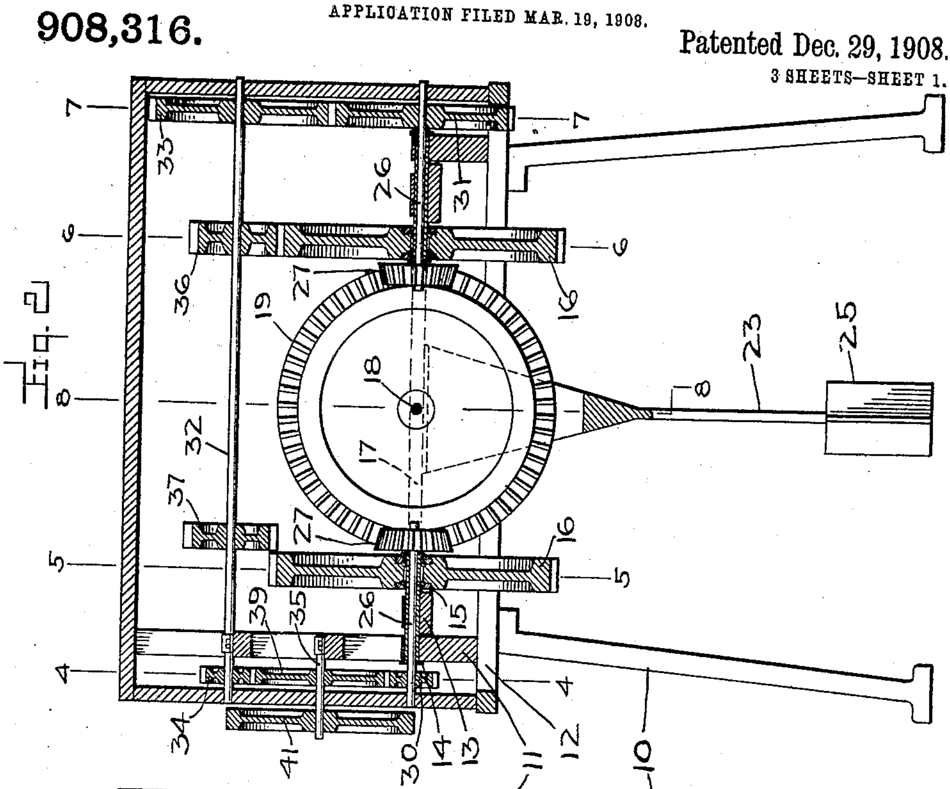
Figure 1:
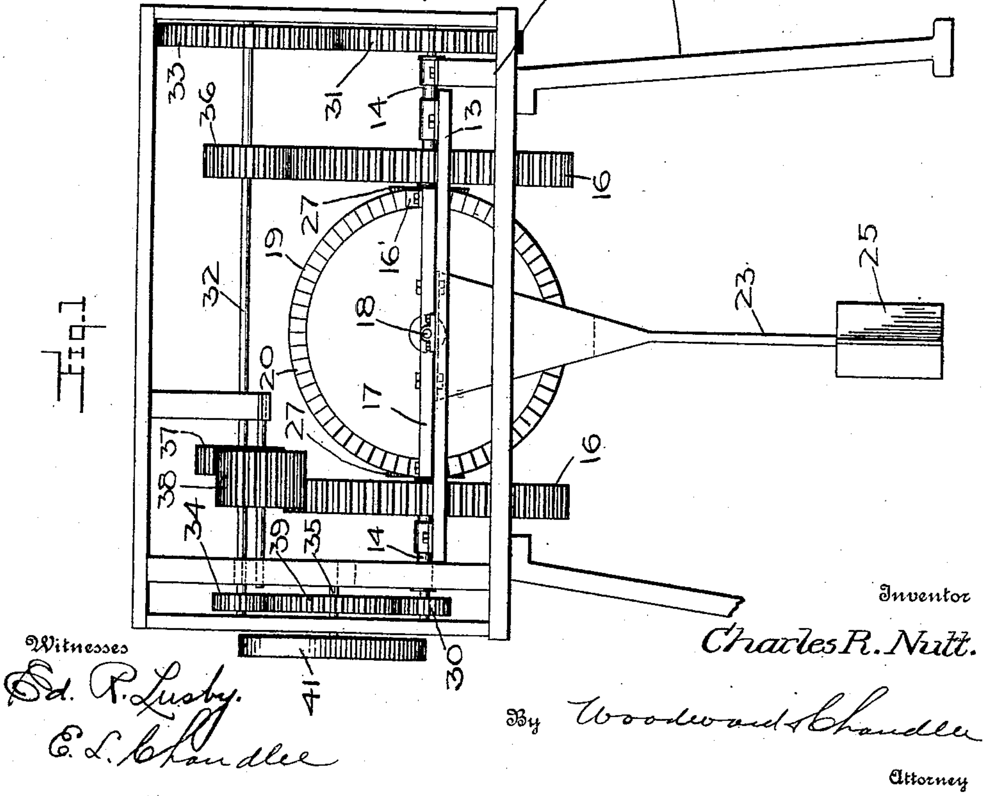
Figure 3:
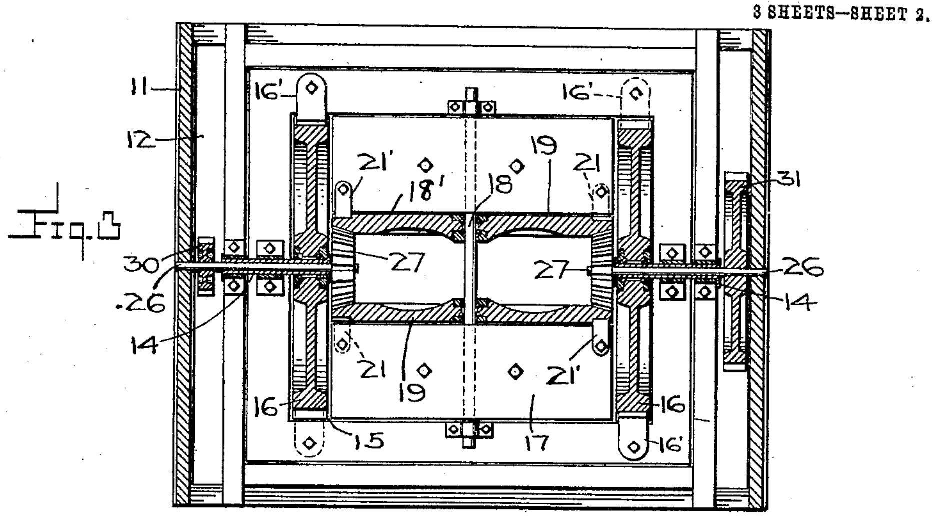
Figure 4:
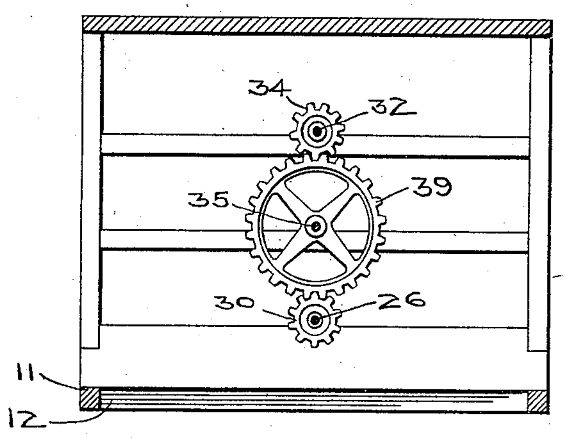
Figure 5:
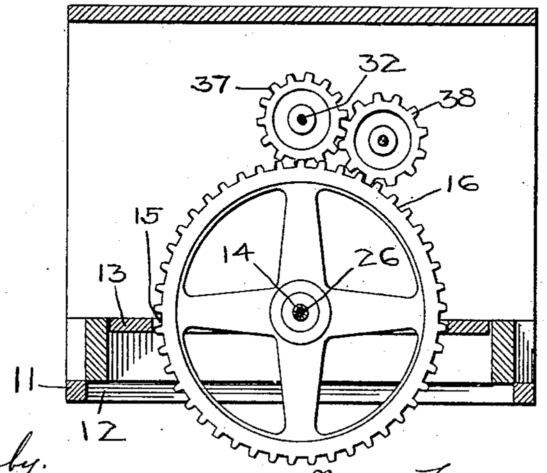
Figure 6:
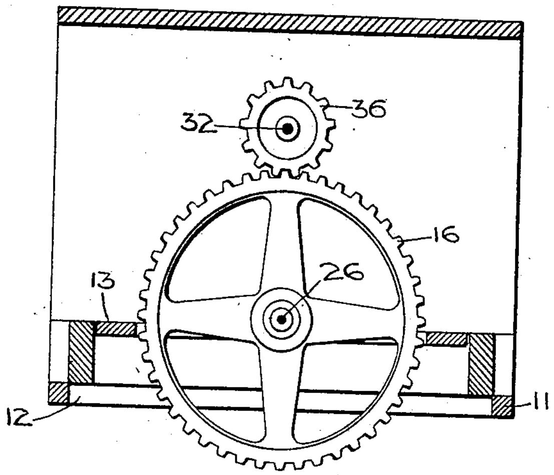
Figure 7:
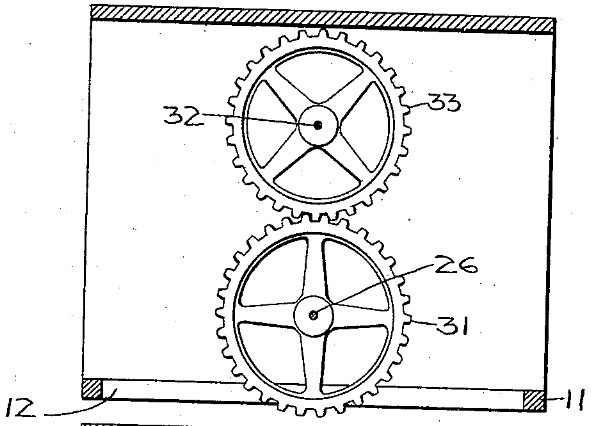
Figure 8:
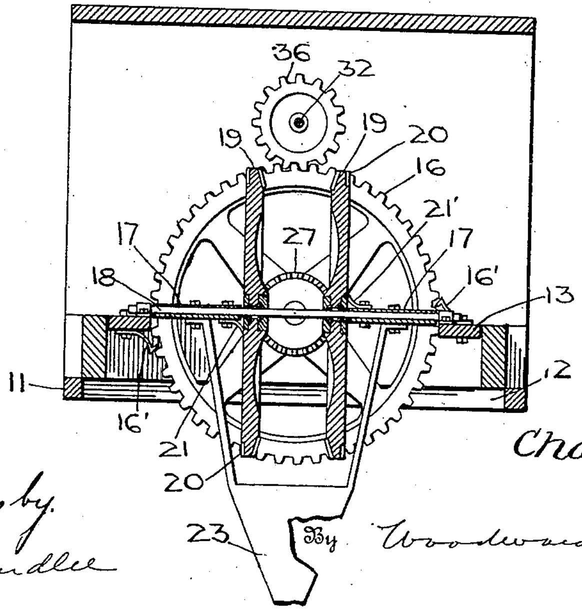

In the drawings forming a portion of this specification and in which like numerals of reference indicate similar parts in the several views, Figure 1 is a side view of the motor applied to the conversion of wave motion into power, Fig. 2 is a sectional view vertically of the motor, Fig. 3 is a sectional view of the motor horizontally, Fig. 4 is a sectional view on the line 4—4 of Fig. 2. Fig. 5 is a similar view on the line 5—5 of Fig. 2. Fig. 6 is a similar view on the line 6—6 of Fig. 2. Fig. 7 is a similar view on the line 7—7 of Fig. 2. Fig. 8 is a sectional view of the motor on the line 8—8 of Fig. 2.

Referring now to the drawings, there is shown a frame work 10 supporting a platform 11 having a square opening 12 therethrough in which there is pivoted a frame 13 carried revolubly on hollow trunnions 14 resting on the platform 11 and projecting inwardly of the walls of the frame. The frame 13 is provided with a square opening 15 at opposite sides of which there are located gear wheels 16 revolubly mounted upon the hollow trunnions 14. Dogs 16′ are carried by the frame 13 and arranged to engage with and rotate the gears 16 in a constant direction when the frame 13 is rocked. A frame 17 is pivoted in the opening 15 upon a shaft 18 extending at right angles to the hollow trunnions 14 and has formed therein a laterally extending opening 18′. Beveled gears 19 are revolubly mounted on the shaft 18 at opposite sides of the opening 18′ their beveled faces being disposed toward each other. On the outer faces of the gears 19 there are peripheral ratchet teeth 20. Dogs 21 and 21′ carried by the frame 13 are arranged to engage in the ratchet teeth 20 to move the gears 19 in a constant direction when the frame 13 is rocked. A depending vane 23 is secured rigidly to the frame 17 and arranged to rock the frame 17 when oscillated upon the axis of the shaft 18, and to rock the frame 13 with oscillation of the vane upon the axis of the trunnions 14. The lower end of the vane is provided with wing portions 25 arranged to be submerged and to receive the force of wave movement of water. Shafts 26 extend through the hollow trunnions 14 and carry at their inner ends beveled gears 27 mutually engaged with the gears 19. At their outer ends the shafts 26 carry gears 30 and 31 respectively. A shaft 32 is mounted in spaced relation with the trunnions 14, and carries at one end a gear 33 meshing with the gear 31. At its opposite end there is a small gear 34. A shaft 35 mounted between the gears 30 and 34 carries at its inner end a gear 39 arranged to mesh mutually with the gear 34 and the gear 30, and at its outer end there is keyed a power wheel 41. A gear 36 is secured to the shaft 32 in mesh with the gear 16. A gear 37 is secured to the shaft 32 adjacent to the gear 16, and a gear 38 is mutually engaged between the gears 16 and 37.

It will be seen that oscillation of the vane 23 on the shaft 18 will cause the dogs 21 to engage with the ratchet teeth 20 on gears 19 on one movement, and the dogs 21′ will engage similarly on the return movement thus rotating the gears 27, which movement will be communicated through the shafts 26 and 32 to the power wheel 41. Oscillation of the vane at right angles to the action previously stated will cause deflection of the frame 13 and a resulting engagement of the dogs 16′ with the gear-wheels 16, rotation of which will be communicated to the shaft 32 through the gears 36 and 37, and thus to the power wheel, movement of which will thus be in a constant direction no matter what the direction of oscillation of the vane.

What is claimed is:

1. A machine of the class described, comprising a multi-pivoted dependent arm arranged for oscillating movement in any direction, gears revolubly mounted on the pivot axes of said arm, operative connection between said gears and a power wheel, pawls carried by the arm and arranged for engagement with the gears for rotation thereof with oscillation of the arm, said gears being arranged to rotate a power wheel in a constant direction resultant from the oscillation of the vane in various directions.

2. An article of the class described comprising pivoted frames, one pivoted within the other, the axes of said pivots being at right angles to each other, a vane dependent from the inner one of said frames and arranged to rock said frames when oscillated, gears revolubly mounted upon the axes of said frames, ratchet and pawl connections between said frames and the gears for rotation of the gears, a power wheel adjacent to said frames, and operative connections between the gears and the power wheel said connections being arranged to communicate rotary movement to the power wheel in a constant direction resultant from the oscillation of the vane in various directions.

In testimony whereof I affix my signature, in presence of two witnesses.

CHAS. R. NUTT.

Witnesses:
LOLA DAMRON,
GEO. A. CORBETT.